United States Patent Office 3,006,729
Patented Oct. 31, 1961

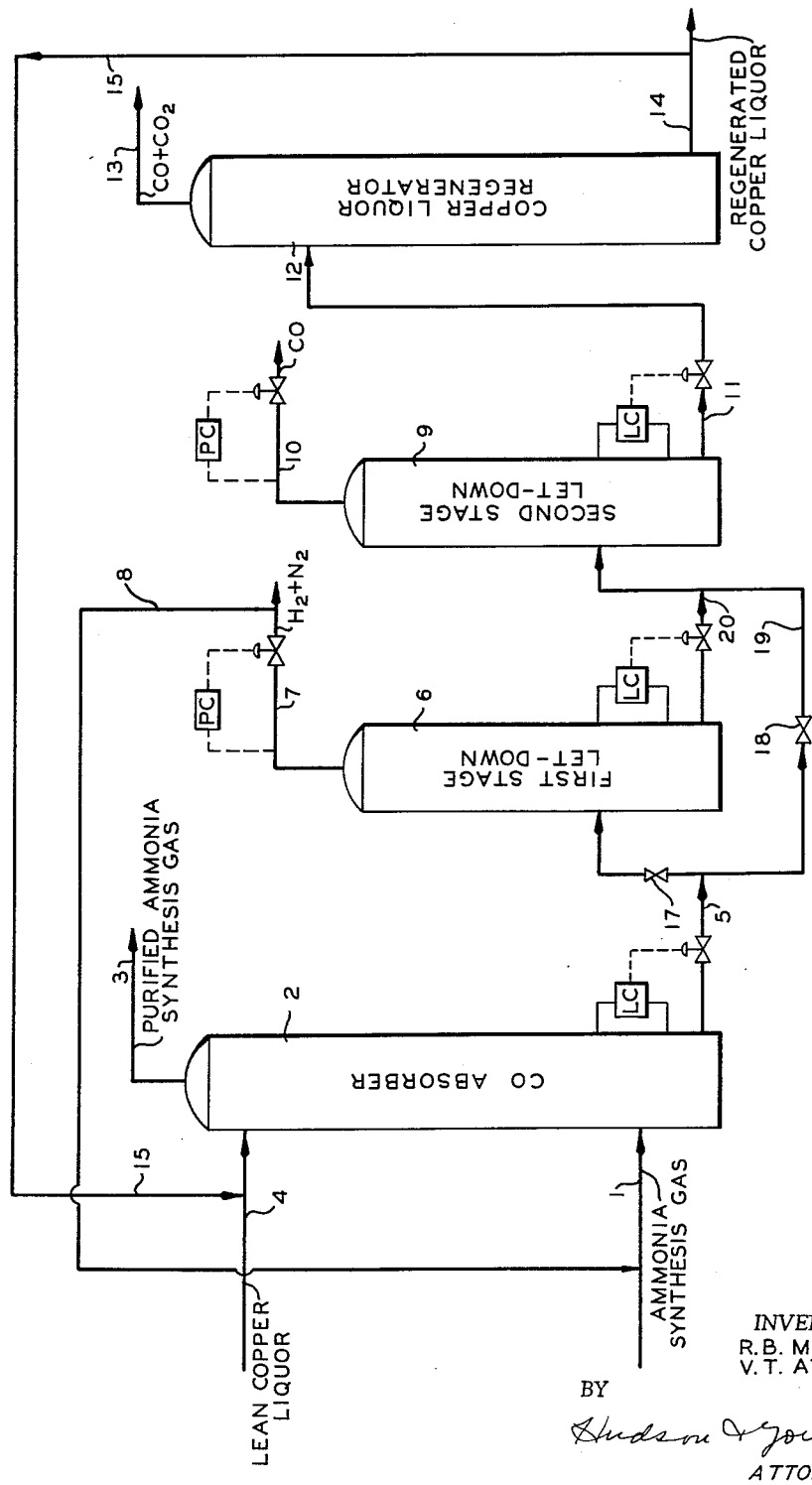

3,006,729
RECOVERY OF HIGH CONCENTRATION CARBON MONOXIDE FROM COPPER LIQUOR USED TO PURIFY AMMONIA SYNTHESIS GAS
Robert B. Moore and Vernon T. Atkinson, Pasadena, Tex., assignors to Phillips Petroleum Company, a corporation of Delaware
Filed June 9, 1958, Ser. No. 740,771
11 Claims. (Cl. 23—204)

This invention relates to the recovery of carbon monoxide from a copper liquor which has been used to purify an ammonia synthesis gas. In one of its aspects, the invention relates to the recovery of carbon monoxide from copper liquor which has been used to purify an ammonia synthesis gas by reducing the pressure of foul copper liquor from an absorber, in which it has been used to treat said synthesis gas, in a plurality of stages. In a more specific aspect of the invention, the foul liquor is flashed in at least one stage to remove substantial quantities of hydrogen and nitrogen therefrom prior to regeneration of said liquor. In a more specific aspect of the invention, the foul liquor is first flashed by substantially reducing the pressure thereon in a manner to obtain substantial quantities of hydrogen and nitrogen which are recycled following which the copper liquor is further flashed by further reducing the pressure thereon to remove therefrom a rich carbon monoxide stream, following which the liquor is regenerated to recover therefrom carbon monoxide and carbon dioxide and lean liquor which can be reused.

The synthesis gas to which the present invention is applicable is well known in the art. One method of generating a synthesis gas is that of the action of steam and air upon a carbonaceous material, yielding a stream containing hydrogen and nitrogen as well as some carbon monoxide, carbon dioxide, etc. It is known to remove carbon monoxide from such gases employing ammoniacal cuprous solutions. Cuprous chloride dissolved in hydrochloric acid or ammoniacal solution or in ortho-anisidine, as disclosed in U.S. Patent 2,519,284, granted August 15, 1950, on application for patent filed by Gardner C. Ray and Paul H. Johnson, and even ammoniacal copper formate solutions have been used. Thus, the particular solution which can be employed in the present invention is subject to the choice of the operator in possession of the present disclosure.

The regeneration of spent or foul copper liquor which has been used to purify ammonia synthesis gas is known and can be eccomplished by heating and/or by air-blowing.

Ordinarily, it has been the practice to pass the foul copper liquor from the absorber to the regenerator zone wherein most of the hydrogen and nitrogen has been removed at atmospheric pressure.

We have now discovered that if a flash pot is installed to vent separately the gas which can be flashed off when the foul copper liquor is let down from approximately 2,000 p.s.i.g. to about 25 to 50 p.s.i.g., it is possible to flash from the copper liquor substantially all of the nitrogen and hydrogen with only about 16 percent of the carbon monoxide. Thus, with a two stage flash system, the first in the flash pot at a pressure of about 25 to 50 p.s.i.g. and the other at 0 p.s.i.g., it is possible to produce a second stage flashed gas stream containing substantially pure carbon monoxide. Thus, if the copper liquor were flashed in two stages from 2000 to 40 p.s.i.g. and then from 40 to 0 p.s.i.g., and then regenerated, the regenerated gases would contain substantially no nitrogen or hydrogen. The regenerated gas stream would be substantially all carbon monoxide and carbon dioxide and the carbon dioxide would be easily removed, thereby providing a second substantially pure carbon monoxide stream. A substantially pure carbon monoxide stream could also be produced by flashing the copper liquor from 2,000 to about 40 p.s.i.g. and then joining the gases flashed by reduction in pressure from about 40 p.s.i.g. to 0 p.s.i.g. with the gases expelled during regeneration of the copper liquor. It would be necessary to purify the combined flashed gases and the gases expelled during regeneration.

It is an object of the invention to provide a method for the recovery of carbon monoxide from a copper liquor containing the same. It is another object of the invention to recover a carbon monoxide stream of increased purity or concentration from a foul copper liquor withdrawn from a treatment of ammonia synthesis gas.

Other aspects, objects, and several advantages of the invention are apparent from this disclosure, the drawing, and the appended claims.

According to the present invention, there is provided a process for the recovery of carbon monoxide from copper liquor which has been used to purify ammonia synthesis gas to remove carbon monoxide therefrom which comprises contacting synthesis gas with lean cuprous solution adapted to remove carbon monoxide from said gas, flashing the used copper liquor by substantially reducing the pressure thereon in a manner to remove substantial quantities of hydrogen and nitrogen therefrom and then regenerating said foul or used copper liquor to obtain additional quantities of carbon monoxide and a regenerated copper liquor which can be reused. Preferably, according to the invention, the pressure on the used copper liquor is reduced in a plurality of stages, in one embodiment in a first stage, the pressure is reduced to flash off hydrogen and nitrogen, in a second stage, the pressure is further reduced to flash off a gas stream very rich in carbon monoxide, and in a third stage, the pressure is reduced on the liquor which is then regenerated to obtain additional quantities of carbon monoxide, some carbon dioxide and a regenerated copper liquor which can be reused.

In another embodiment the used copper liquor is passed from the ammonia synthesis gas purification step to a zone in which its pressure is reduced to such a low pressure, say 25–50 p.s.i.g., that the said low pressure is just sufficient to convey the thus flashed liquor to a regeneration zone.

Referring now to the drawing, ammonia synthesis gas fed by way of pipe 1 is contacted with lean copper liquor, fed by way of pipe 4 in absorber 2. Absorber 2 is operated under an elevated pressure, in this instance, approximately 2,000 pounds per square inch gage. The copper liquor enters the absorber at approximately 32° F. A purified synthesis gas is removed overhead by way of pipe 3. Copper liquor, which now contains hydrogen and nitrogen, some methane, carbon monoxide, and carbon dioxide is passed by way of valve-controlled pipe 5 to first stage let-down vessel 6. In this vessel, the temperature and pressure are, respectively, 70–80° F. and 40 pounds per square inch gage. Hydrogen and nitrogen-containing gas is taken off overhead by way of valve-controlled pipe 7. In this example, this mixture of hydrogen and nitrogen which contains some of the other gases originally present in the used liquor is passed by way of pipe 8 to pipe 1. Liquor is passed from vessel 6 by way of valve-controlled pipe 20 to second stage let-down 9. The temperature and pressure in stage 9 are, respectively, 40° F. and zero pounds per square inch gage. A carbon monoxide-containing gas stream is taken off overhead by way of valve-controlled pipe 10 as a product of the process. Liquor is passed by way of valve-controlled pipe 11 to copper liquor regenerator 12. In this regenerator, there is produced from the liquor a stream containing substantially only carbon monoxide and carbon dioxide which is rich in CO and which, according to the invention, is richer in CO than streams which heretofore have been obtained from regenerators, and which is taken overhead by way of pipe 13 as another product of the process, and regenerated copper liquor which is removed by way of pipe 14. In this example, a regenerated copper liquor is passed by way of pipe 15 to pipe 4 for reuse in absorber 2.

The following tabular data represent the qualitative and quantitative analysis of the various gas streams and the liquor used in the example.

It will be evident to one skilled in the art in possession of this disclosure that the precise conditions maintained in the several stages or steps of the operation are subject to variation and modification depending upon the composition of the synthesis gas to be purified, the copper liquor which is used in absorber 2, and the compositions of the respective streams which may be desired in an individual case. The invention is not limited to any particular copper solution, the concept of the invention residing essentially in the finding that a combination of steps is beneficial as herein disclosed and claimed in the appended claims.

As a modification of the operation described above, by closing valve 17 in pipe 5 and opening valve 18 in pipe 19, vessel 6 can be by-passed. In this event the copper liquor will be flashed in vessel 9 from 2,000 to about 25 to 50 p.s.i.g., or even lower. The flashed liquor from column 9 will be passed through line 11 into copper liquor regenerator 12. The carbon monoxide containing gases passed through line 13 will be the by-product.

EXAMPLE

The data presented in the following table were obtained by passing 39,000 s.c.f.m. of ammonia synthesis gas through a copper liquor absorber with copper liquor flowing down through the absorber at the rate of 348 gallons per minute. The gas contained 2.5 percent CO and 0.4 percent $CO_2$. The gases given in column 1 are the total gases absorbed per minute in the copper liquor absorber. The gases shown in column 2 are the gases which are liberated from the spent copper liquor when it is flashed from 2,000 to 0 p.s.i.g. The gases given in column 3 are those which are boiled from the fouled copper solution when the pressure is first reduced from 2,000 to 0 p.s.i.g. The gases given in column 4 are those which are flashed from the spent copper liquor when it is flashed from 2,000 to 40 p.s.i.g. The gases given in column 5 are those which are flashed when the pressure is reduced from 40 to 0 p.s.i.g., after the liquor has previously been flashed from 2,000 to 40 p.s.i.g. The gases given in column 6 are those which are boiled from the spent copper liquor, after it has previously been flashed from 2,000 to 40 p.s.i.g., and again flashed from 40 to 0 p.s.i.g. The gases given in column 7 are those which would be flashed and boiled from the spent copper liquor after the spent copper liquor had been flashed from 2,000 to 40 p.s.i.g. The gases given in the various columns are on an ammonia and moisture-free basis. The table shows that the gases liberated during the second stage flashing of the copper liquor have a higher concentration of CO than those gases flashed from the solution during the first stage flashing or the boiling of the copper liquor. Since the gases flashed when the pressure is reduced from 2,000 to 40 p.s.i.g. have a higher concentration of hydrogen and nitrogen, this stream of gas is recirculated to the copper liquor absorber according to the invention which, in the first place, permits obtaining said gases by steps described herein.

Thus, if the copper liquor is flashed to atmospheric pressure and regenerated, the gases shown in column 1 of the table will be discharged from the solution. However, if this fouled solution is passed into vessel 6 and flashed to 40 p.s.i.g., the gases liberated will be those shown in column 4 of the table. If the copper liquor from vessel 6 is next passed to vessel 9, wherein the pressure is reduced to atmospheric pressure, the gases liberated will be those shown in column 5 of the table. If the copper liquor from vessel 9 is next passed into vessel 12 and there stripped of gases, the gases stripped will be those shown in column 6 of the table.

If the copper liquor from column 2 is by-passed around vessel 6 into vessel 9 and the pressure in vessel 9 is reduced from 2,000 to 0 p.s.i.g., the gases liberated will be those shown in column 2 of the table.

If the copper liquor is by-passed around vessels 6 and 9 and passed directly into vessel 12 wherein the pressure is reduced from 2,000 p.s.i.g. to atmospheric, and the copper liquor is regenerated, the gases passing out through line 13 are those shown in column 1 of the table.

Seventy pounds per hour of ammonia are added to the regenerators wherein the saturated copper solution is regenerated and passed to the surge tank of the lean copper solution.

The copper liquor used in the above data was a solution containing 3 grams cupric ions, 9 grams cuprous ions, 3 grams of formic acid, 12 grams of carbonic acid, and 18 grams of ammonia per 100 milliliters copper liquor. The remainder was water.

In regenerator 12 the pressure is as high as about 1 to 2 p.s.i.g. at the top and the solution is at about 25 to 30° C. In the reduction section of the regenerator 12, the temperature of the solution is about 50 to 55° C. The regenerator kettle is 75 to 80° C.

The pressure in the stages of the invention can be varied from those which are disclosed in the example given herein. The absorber 2 can be operated at a pressure in the range 1500 to 2500 p.s.i.g. In the first let-down stage, the pressure can be in the range 25 to 250 p.s.i.g. In the second let-down stage when it is used, the pressure can be atmospheric or thereabouts. These pressures are those presently desired for the general use of solution now processed and herein discussed. However, the optimum pressure which can be outside the given ranges in a particular instance can be determined Table

| | Total Regeneration Off-Gases | | Gases Flashed From Spent Liquor From 2,000 to 0 p.s.i.g. | | Gases Boiled From Liquor After Flashing From 2,000 to 0 p.s.i.g. | | Gases Flashed From Spent Liquor When Pressure is Reduced From 2,000 to 40 p.s.i.g. | | Gases Flashed In Reducing Pressure From 40 to 0 p.s.i.g. After Liquor Had Been Flashed to 40 p.s.i.g. | | Gases Boiled From Spent Liquor After Flashing From 2,000 to 40 p.s.i.g. and 40 to 0 p.s.i.g. | | Gases Boiled From Spent Liquor By Flashing and Boiling After Liquor Had Been Flashed From 2,000 to 40 p.s.i.g. | |
|---|---|---|---|---|---|---|---|---|---|---|---|---|---|---|
| | Percent | S.c.f.m. | Percent | S.c.f.m. | Percent | S.c.f.m. | Percent | S.c.f.m. | Percent | S.c.f.m. | Percent | S.c.f.m. | Percent | S.c.f.m. |
| $CO_2$ | 12.0 | 148 | 1.1 | 7 | 24.9 | 141 | .8 | 2 | .9 | 4 | 24.6 | 142 | 14.6 | 146 |
| CO | 82.3 | 1,012 | 88.5 | 586 | 75.1 | 426 | 69.3 | 158 | 98.8 | 418 | 75.4 | 436 | 85.3 | 854 |
| $H_2$ | 4.8 | 59 | 8.9 | 59 | | 0 | 25.2 | 58 | .3 | 1 | | 0 | .1 | 1 |
| $N_2$ | .8 | 10 | 1.5 | 10 | | 0 | 4.5 | 10 | .0 | 0 | | 0 | | 0 |
| $CH_4$ | .1 | 1 | | 0 | | 0 | .2 | 1 | .0 | 0 | | 0 | | 0 |
| | 100.0 | 1,230 | 100.0 | 662 | 100.0 | 567 | 100.0 | 229 | 100 | 423 | 100 | 578 | 100 | 1,001 | by mere routine test by one skilled in the art in possession of this disclosure and will depend upon the variable in the process such as the pressure of the CO absorber, rate of flow of lean copper liquor to the absorber which in turn will affect the concentration of the gases absorbed and the concentration of the components in the gas.

There can be employed in the flash vessel or vessels steam heaters to aid the removal from the copper liquor of the gas or gases to be removed therefrom.

The advantages of first flashing from a pressure of the order of 2,000 p.s.i.g. to one of the order of 40 p.s.i.g. and then regenerating the liquor are, therefore, apparent from the table. This results in obtaining the recycle stream 8 of the invention. Also, the stage-wise flashing before regeneration leads to a gas rich in carbon monoxide and very poor in hydrogen and nitrogen.

Reasonable variation and modification are, therefore, possible within the scope of the foregoing disclosure, drawing, and the appended claims to the invention, the essence of which is that used copper liquor which has been enriched in carbon monoxide in the purification of synthesis gas in the production of ammonia is flashed at a reduced pressure to remove substantial quantities of hydrogen and nitrogen therefrom and further flashed to obtain an enriched carbon monoxide-containing stream therefrom.

We claim:
1. A method for the recovery of a gas rich in carbon monoxide from a copper-containing solution, which has been used to absorb carbon monoxide from ammonia synthesis gas, which consists essentially of contacting a copper-containing solution with a synthesis gas under carbon monoxide absorbing conditions including a pressure of the order of approximately 2,000 pounds per square inch gage, containing the used solution at said pressure, said used solution containing substantial amounts of hydrogen and nitrogen and small amounts of carbon monoxide and carbon dioxide as well as traces of other gases, flashing said used solution at a pressure of the order of 40 pounds per square inch gage removing therefrom a first stream of gases containing a substantial amount of hydrogen and nitrogen and carbon monoxide which are unavoidably absorbed during said contacting, then further flashing the once-flashed solution at about zero pounds per square inch gage obtaining a second stream of gases containing substantially more carbon monoxide and substantially less hydrogen and nitrogen than said first stream of gases and then recovering gases remaining in the twice-flashed solution obtaining a third stream of gases rich in carbon monoxide and containing only small quantities of hydrogen and nitrogen.

2. A method according to claim 1 wherein said first gases are returned to said contacting.

3. The recovery of carbon monoxide from an ammonia synthesis gas consisting essentially of hydrogen and nitrogen containing carbon monoxide in an amount of the order of a few percent which consists essentially of contacting said gas at an elevated pressure in the range of about 1,500 p.s.i.g. to about 2,500 p.s.i.g. with an ammoniacal copper-containing solution, thus removing carbon monoxide from said gases, flashing said thus-used solution at a first reduced pressure in the range of about 25 p.s.i.g. to about 250 p.s.i.g. to remove a substantial quantity of the hydrogen and nitrogen unavoidably absorbed therein therefrom and then further reducing the pressure on the flashed solution to not below about atmospheric pressure to recover therefrom a stream rich in carbon monoxide gas.

4. The recovery of carbon monoxide from a copper-containing solution which has been used at an elevated pressure of the order of approximately 2,000 p.s.i.g. to remove carbon monoxide from ammonia synthesis gas generated by the action of steam and air upon a carbonaceous material, the used copper-containing solution containing hydrogen and nitrogen, as well as some carbon monoxide, carbon dioxide, and traces of other gases, which consists essentially of flashing said solution at a first reduced pressure of the order of approximately 50 p.s.i.g. to remove a substantial quantity of nitrogen and hydrogen therefrom and then further reducing the pressure on the flashed solution to not below about atmospheric pressure to recover therefrom a carbon monoxide gas containing gas stream.

5. A method for the recovery of a gas rich in carbon monoxide from a copper-containing solution which has been used at an elevated pressure to remove carbon monoxide from ammonia synthesis gas generated by the action of steam and air upon a carbonaceous material, yielding a gas stream containing hydrogen, nitrogen and small amounts of carbon monoxide and carbon dioxide, as well as traces of other gases, which consists essentially of contacting said copper-containing solution with said synthesis gas under carbon monoxide absorbing conditions including a pressure of the order of approximately 2,000 pounds per square inch gage, containing said solution at said pressure, flashing said used solution at a pressure of the order of 40 pounds per square inch gage removing therefrom a first stream of gases containing a substantial amount of hydrogen and nitrogen and carbon monoxide which are unavoidably absorbed during said contacting, then further flashing the once-flashed solution at about zero pounds per square inch gage obtaining a second stream of gases containing substantially more carbon monoxide and substantially less hydrogen and nitrogen than said first stream of gases and then recovering gases remaining in the twice-flashed solution obtaining a third stream of gases rich in carbon monoxide and containing only small quantities of hydrogen and nitrogen.

6. The recovery of carbon monoxide from an ammonia synthesis gas consisting essentially of hydrogen and nitrogen and containing a small amount of carbon monoxide in an amount of the order of a few percent obtained by the action of steam and air upon a carbonaceous material which consists essentially of contacting said gas at an elevated pressure in the range of about 1,500 p.s.i.g. to about 2,500 p.s.i.g. with an ammoniacal copper-containing solution, thus removing carbon monoxide from said gases, flashing said thus-used solution at a first reduced pressure in the range of about 25 p.s.i.g. to about 250 p.s.i.g. to remove a substantial quantity of the hydrogen and nitrogen unavoidably absorbed therein therefrom and then further reducing the pressure on the flashed solution to not below about atmospheric pressure to recover therefrom a stream rich in carbon monoxide gas.

7. The recovery of carbon monoxide from a copper-containing solution which has been used to remove carbon monoxide from ammonia synthesis gas at an elevated pressure in the range of about 1,500 p.s.i.g. to about 2,500 p.s.i.g., said copper-containing solution containing substantial amounts of hydrogen and nitrogen and small amounts of carbon monoxide and carbon dioxide as well as traces of other gases, which consists essentially of flashing said solution at a first reduced pressure in the range of about 25 p.s.i.g. to about 250 p.s.i.g. to remove a substantial quantity of hydrogen and nitrogen therefrom, and then further reducing the pressure on the flashed solution to not below about atmospheric pressure to recover therefrom a carbon monoxide gas-containing gas stream.

8. A method for recovering carbon monoxide from a cuprous ion-containing solution which has been used to remove carbon monoxide from ammonia synthesis gases at an elevated pressure in the range of about 1,500 p.s.i.g. to about 2,500 p.s.i.g., said cuprous ion-containing solution containing substantial amounts of hydrogen and nitrogen and small amounts of carbon monoxide and carbon dioxide as well as traces of other gases, which consists essentially of producing in a first stage let-down the pressure on said solution to a value within the range of about 25 p.s.i.g. to about 250 p.s.i.g. to remove therefrom a substantial quantity of hydrogen and nitrogen, further reducing the pressure on said solution in a second stage letdown to not below about atmospheric pressure to recover carbon monoxide therefrom, and then further reducing the pressure on said solution and regenerating the same.

9. The recovery of carbon monoxide from a carbon monoxide containing copper liquor obtained at an elevated pressure on the order of about approximately 2,000 p.s.i.g. from the purification of ammonia synthesis gases, said copper liquor containing substantial amounts of hydrogen and nitrogen and a minor amount of carbon monoxide, which consists essentially of reducing the pressure on said liquor in a plurality of stages to a pressure of the order of approximately atmospheric pressure, the pressure of one of the intermediate stages being of the order of 50 p.s.i.g., to obtain at least one stream containing hydrogen and nitrogen and at least one other stream rich in carbon monoxide.

10. The recovery of carbon monoxide from a copper liquor obtained from the purification of ammonia synthesis gases at an elevated pressure of the order of approximately 2,000 p.s.i.g., said copper liquid containing substantial amounts of hydrogen and nitrogen and a minor amount of carbon monoxide, which comprises reducing the pressure on said liquor to a pressure of the order of approximately 40 p.s.i.g. so as to obtain at least one stream containing hydrogen and nitrogen, further reducing the pressure on said liquor to a pressure of the order of approximately atmospheric pressure to obtain at least one stream containing carbon monoxide, and then recovering additional carbon monoxide from said liquor by regeneration of said liquor.

11. A method according to claim 7 wherein said hydrogen and nitrogen are returned to an absorber in which said copper-containing solution is used.

References Cited in the file of this patent

UNITED STATES PATENTS

| | | |
|---|---|---|
| 2,043,263 | Porter | June 9, 1936 |
| 2,580,527 | Deringer | Jan. 1, 1952 |
| 2,824,886 | Barry | Feb. 25, 1958 |

FOREIGN PATENTS

| | | |
|---|---|---|
| 293,138 | Great Britain | July 5, 1928 |
| 304,345 | Great Britain | Jan. 17, 1929 |
| 680,849 | Great Britain | Oct. 15, 1952 |